US012533393B2

(12) United States Patent
Wai et al.

(10) Patent No.: US 12,533,393 B2
(45) Date of Patent: Jan. 27, 2026

(54) VIBRIO CHOLERAE PROTEIN FOR USE AGAINST CANCER

(71) Applicant: Linnane Pharma AB, Malmo (SE)

(72) Inventors: Sun Nyunt Wai, Umea (SE); Bernt Eric Uhlin, Umea (SE); Aftab Nadeem, Malmo (SE); Karina Persson, Umea (SE)

(73) Assignee: Linnane Pharma AB, Malmo (SE)

( * ) Notice: Subject to any disclaimer, the term of this patent is extended or adjusted under 35 U.S.C. 154(b) by 804 days.

(21) Appl. No.: 17/768,084

(22) PCT Filed: Oct. 9, 2020

(86) PCT No.: PCT/SE2020/050968
§ 371 (c)(1),
(2) Date: Apr. 11, 2022

(87) PCT Pub. No.: WO2021/071419
PCT Pub. Date: Apr. 15, 2021

(65) Prior Publication Data
US 2024/0082350 A1    Mar. 14, 2024

(30) Foreign Application Priority Data

Oct. 11, 2019 (SE) .................................. 1930324-7

(51) Int. Cl.
| A61K 38/16 | (2006.01) |
| A61K 31/282 | (2006.01) |
| A61K 31/513 | (2006.01) |
| A61P 35/00 | (2006.01) |

(52) U.S. Cl.
CPC .......... A61K 38/164 (2013.01); A61K 31/282 (2013.01); A61K 31/513 (2013.01); A61P 35/00 (2018.01)

(58) Field of Classification Search
None
See application file for complete search history.

(56) References Cited

FOREIGN PATENT DOCUMENTS

| WO | 2007/044321 A2 | 4/2007 |
| WO | 2016/164636 A1 | 10/2016 |
| WO | 2019/047679 A1 | 3/2019 |
| WO | 2019/115001 A1 | 6/2019 |
| WO | 2021/071419 A1 | 4/2021 |

OTHER PUBLICATIONS

Devos et al., (Proteins: Structure, Function and Genetics, 2000, vol. 41: 98-107).*
Whisstock et al., (Quarterly Reviews of Biophysics 2003, vol. 36 (3): 307-340,).*
Swedish search report relating to Swedish Application No. 1930324-7, dated Feb. 20, 2020; 11 pgs.
International Search Report and Written Opinion relating to International Application No. PCT/SE2020/050968, dated Nov. 10, 2020; 17 pgs.
Bleiberg et al., "Oxaliplatin Plus 5-Fluorouracil: Clinical Experience in Patients With Advanced Colorectal Cancer," Seminars in Oncology, 1998, pp. 32-39, vol. 25, No. 2, Suppl 5.
Dongre et al., "Flagella-mediated secretion of a novel *Vibrio cholerae* cytotoxin affecting both vertebrate and Invertebrate hosts," Communications Biology, 2018, pp. 1-12, vol. 1.
Doulberis et al., "Cholera-toxin suppresses carcinogenesis in a mouse model of inflammation-driven sporadic colon cancer," Carcinogenesis, 2015, pp. 280-290, vol. 36, No. 2.
RN 290420-34-7, [online] [retrieved on Feb. 13, 2020] Retrieved from: STN, database Registry, Entered STN: Sep. 25, 2000, 1 page.
The extended European Search Report in related EP Application No. 20874432.6, dated Jan. 4, 2024, 8 pages.
Ray et al., "PAR-1 mediated apoptosis of breast cancer cells by *V. cholerae* hemagglutinin protease", Apoptosis, Feb. 20, 2016, pp. 609-620, vol. 21, No. 5.

\* cited by examiner

*Primary Examiner* — Jennifer E Graser
(74) *Attorney, Agent, or Firm* — Polsinelli PC

(57) ABSTRACT

The invention relates to a *Vibrio cholerae* MakA (motility associated killing factor A) protein for use in therapy, in particular in the treatment or alleviation of cancer such as colorectal cancer. The invention further relates to pharmaceutical compositions comprising a *Vibrio cholerae* MakA protein as an active ingredient, as well as to methods for treating or alleviating cancer, comprising administering to a subject a therapeutically effective amount a *Vibrio cholerae* MakA protein.

13 Claims, 11 Drawing Sheets

Specification includes a Sequence Listing.

(A)

VIBRIO CHOLERAE PROTEIN FOR USE AGAINST CANCER

CROSS-REFERENCE TO RELATED APPLICATIONS

This application is a U.S. National Stage Application of International Application No. PCT/SE2020/050968, filed Oct. 9, 2020, which claims the benefit of, and priority to, SE Application No. 1930324-7, filed Oct. 11, 2019, the entire contents of which are hereby incorporated by reference in their entirety.

SEQUENCE LISTING

This application contains a Sequence Listing that has been submitted in ASCII format via EFS-Web and is hereby incorporated by reference in its entirety. The ASCII copy is named "Sequence_listing_051875_725177.txt", was created on Apr. 11, 2022, and is 15,000 bytes in size.

TECHNICAL FIELD

The invention relates to a *Vibrio cholerae* MakA (motility associated killing factor A) protein for use in therapy, in particular in the treatment or alleviation of cancer such as colorectal cancer. The invention further relates to pharmaceutical compositions comprising a *Vibrio cholerae* MakA as an active ingredient, as well as to methods for treating or alleviating cancer, comprising administering to a subject a therapeutically effective amount a MakA protein.

BACKGROUND ART

Cholera toxin (CT), a virulence factor secreted by the Gram-negative bacterium *Vibrio cholerae*, is sufficient to induce the severe diarrhea characteristic of cholera (Kaper J. B. et al. (1995) *Clin. Microbiol. Rev.* 8: 48-86; Sack, D. A. et al. (2004) *Lancet* 363:223-233). Using *Caenorhabditis elegans* as an infection host model for *Vibrio cholerae* predator interactions, Sun Nyunt Wai and coworkers (Dongre, M. et al. (2018) *Commun Biol.* 1: article 59) discovered a bacterial cytotoxin, MakA, whose function as a virulence factor relies on secretion via the flagellum channel in a proton motive force-dependent manner. The MakA protein is expressed from the polycistronic makDCBA (motility-associated killing factor) operon. Bacteria expressing the Mak proteins encoded by the makDCBA operon induced dramatic changes in intestinal morphology leading to a defecation defect, starvation and death in *C. elegans*. The Mak proteins also promoted *V. cholerae* colonization of the zebrafish gut causing lethal infection.

A structural model of purified MakA at 1.9 Å resolution indicated similarities to members of a superfamily of bacterial toxins with unknown biological roles (Dongre et al., 2018). The said toxins include hemolysin BL (HBL-B) and the non-hemolytic enterotoxin (NheA) from *Bacillus cereus*, as well as cytolysin A (ClyA) from *E. coli*. This toxin family comprises bacterial pore-forming toxins which are found ubiquitously throughout prokaryotic and eukaryotic domains of life, contributing centrally to virulence and defense (Dal Peraro, M. & van der Goot, F. G. (2016) *Nat. Rev. Microbiol.* 14:77-92). Cancer is not a single disease but a set of complex events with distinct genetic and histological features. However, all cancers are characterized by several biological traits among which uncontrolled cell proliferation is the most fundamental trait. Despite substantial efforts, cancer remains a leading cause of death worldwide. During the year 2012 alone 14.1 million cases of cancer were diagnosed, and 8.2 million deaths were reported worldwide, thus making it most widespread and fatal diseases across the globe. Among different types of cancer, colon (colorectal) cancer is considered as the third most common type of cancer and the second leading cause of cancer-related death in industrialized countries of the world. It originates from neoplastic transformation of epithelial cells of the colon. Both environmental and genetic factors play an important role in development of colon cancer.

Attempts have been made to understand underlying molecular mechanisms responsible for causing colon cancer with a focus on identification of germline and somatic mutations. In particular, the Wnt signaling pathway has emerged as a key pathway for colon cancer tumorigenesis (Markowitz, S. D. & Bertagnolli, M. M. (2009) *N Engl J Med.* 361(25): 2449-2460). Colorectal cancers acquire many genetic changes, but certain signaling pathways are clearly singled out as key factors in tumor formation. One of these changes, the activation of the Wnt signaling pathway, is regarded as the initiating event in colorectal cancer. Wnt signaling occurs when the oncoprotein β-catenin binds to nuclear partners (members of the T-cell factor-lymphocyte enhancer factor family) to create a transcription factor that regulates genes involved in cellular activation. The β-catenin degradation complex controls levels of the β-catenin protein by proteolysis. A component of this complex, adenomatous polyposis *coli* (APC) also known as deleted in polyposis 2.5 (DP2.5) is a protein encoded by the APC gene (Nishisho, I. et al. (1991). *Science.* 253 (5020): 665-9). The APC protein is a negative regulator that controls beta-catenin concentrations. Mutations in the APC gene may result in colorectal cancer. APC, not only degrades β-catenin but also inhibits its nuclear localization. The most common mutation in colorectal cancer inactivates the gene that encodes the APC protein. In the absence of functional APC, Wnt signaling is inappropriately and constitutively activated (Markowitz & Bertagnolli, 2009).

The treatment of established colon cancer remains a major challenge. There are several strategies available to combat colon cancer which includes surgery, chemotherapy and radiation therapy, unfortunately, all these strategies come with major side effects. Thus, the development of a novel class of anticancer molecules is an urgent need to combat colon cancer. Among them, bacterial proteins and peptides are a promising group of bioactive molecules with cancer-specific treatment potential.

A) Individual component of the mak operon including MakA overexpressed in *E. coli* were not lethal to *C. elegans*. However, overexpression of at least three components (makCBA) or whole operon (makDCBA) was required for lethality against *C. elegans*. (Dongre et al. (2018) *Commun Biol.* 2018 Jun. 7; 1:59) B) MakA causes cell death in tumor cell lines (HCT8 and DLD1=colon cancer cell, PC3=Prostate cancer cells, HTB9=Bladder cancer cell, PC3=Prostate cancer cell, Suit2=Pancreatic cancer cell, MCF7=Breast cancer cells) of diverse origin. The healthy non-cancerous cells from colon (CCD-18Co and CCD 841 CoN), prostate (PNT1A) and oral fibroblasts (PDL1) were intermediately sensitive compared to tumor cells. C) MakA failed to induce hemolysis in human RBCs. TritonX-100

(0.1%) induced RBCs hemolysis was used as a positive control. D) MakA induced dramatic changes in tumor cell morphology, unlike non-cancerous PDL1 fibroblasts that were largely unaffected. Scale bar=20 μm.

Figure 2:
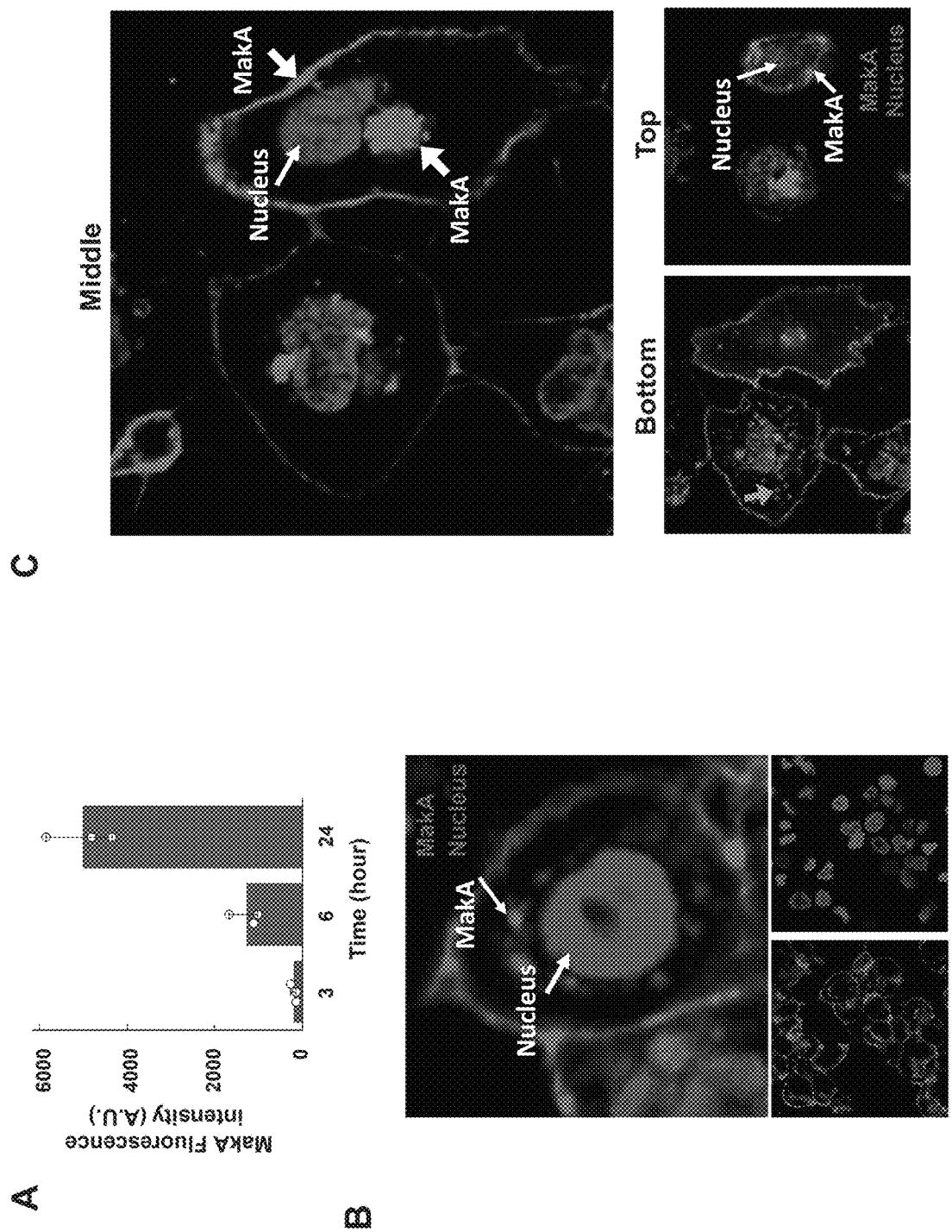

FIG. 2: MakA accumulates on tumor cell surface and intracellular compartments.

A) Time-dependent cellular uptake of MakA in colon carcinoma cells. B-C) Live cell confocal microscopy for cellular uptake of MakA in colon carcinoma cells (HCT8) or pancreatic cancer cells (Suit2), 24 hours after Alexa 568 labelled MakA (250 nM) treatment. Cells were counterstained for the nuclei with Hoechst 33342. Scale bar=10 μm.

Figure 3:
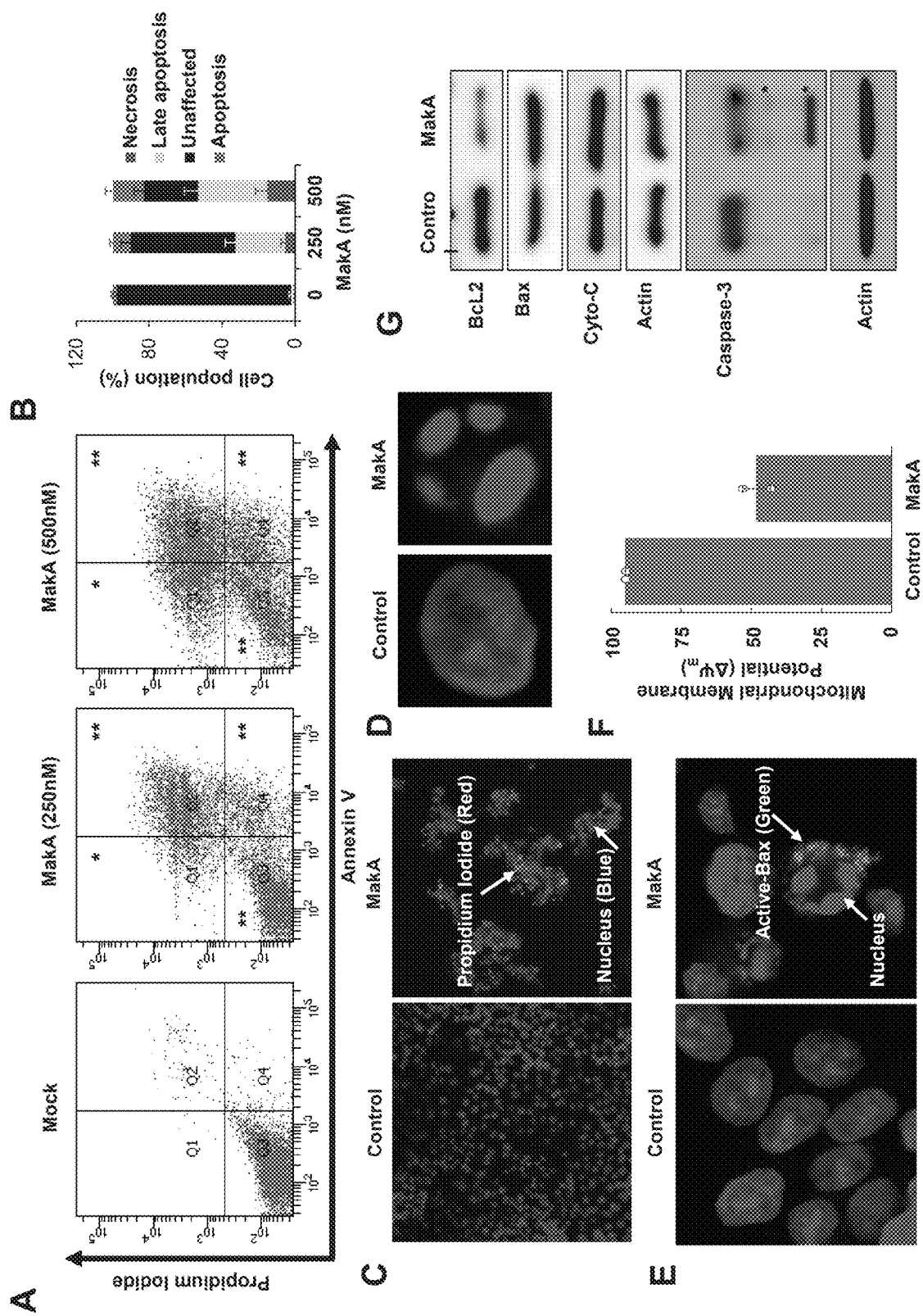

FIG. 3: MakA induces apoptosis in tumor cells.

A) MakA induces concentration-dependent apoptotic cell death in HCT8 cells. B) Quantification of flow cytometry events from (A). C) MakA causes permeabilization of tumor cell plasma membrane as evident by uptake of propidium iodide. Scale bar=50 μm. D) MakA induces fragmentation of tumor cell nuclei. Scale bar=10 μm E) Accumulation of Bax (green) to the mitochondria of apoptotic cells by MakA. DAPI was used as a nuclear marker. Scale bar=10 μm. F) MakA caused loss of mitochondrial potential in colon carcinoma cells as evident by loss of DiOC6 staining, quantified by flow cytometry. G) MakA causes activation of pro-apoptotic proteins including caspase 3, cytochrome C and Bax and suppression of antiapoptotic protein, Bcl2.

Figure 4:
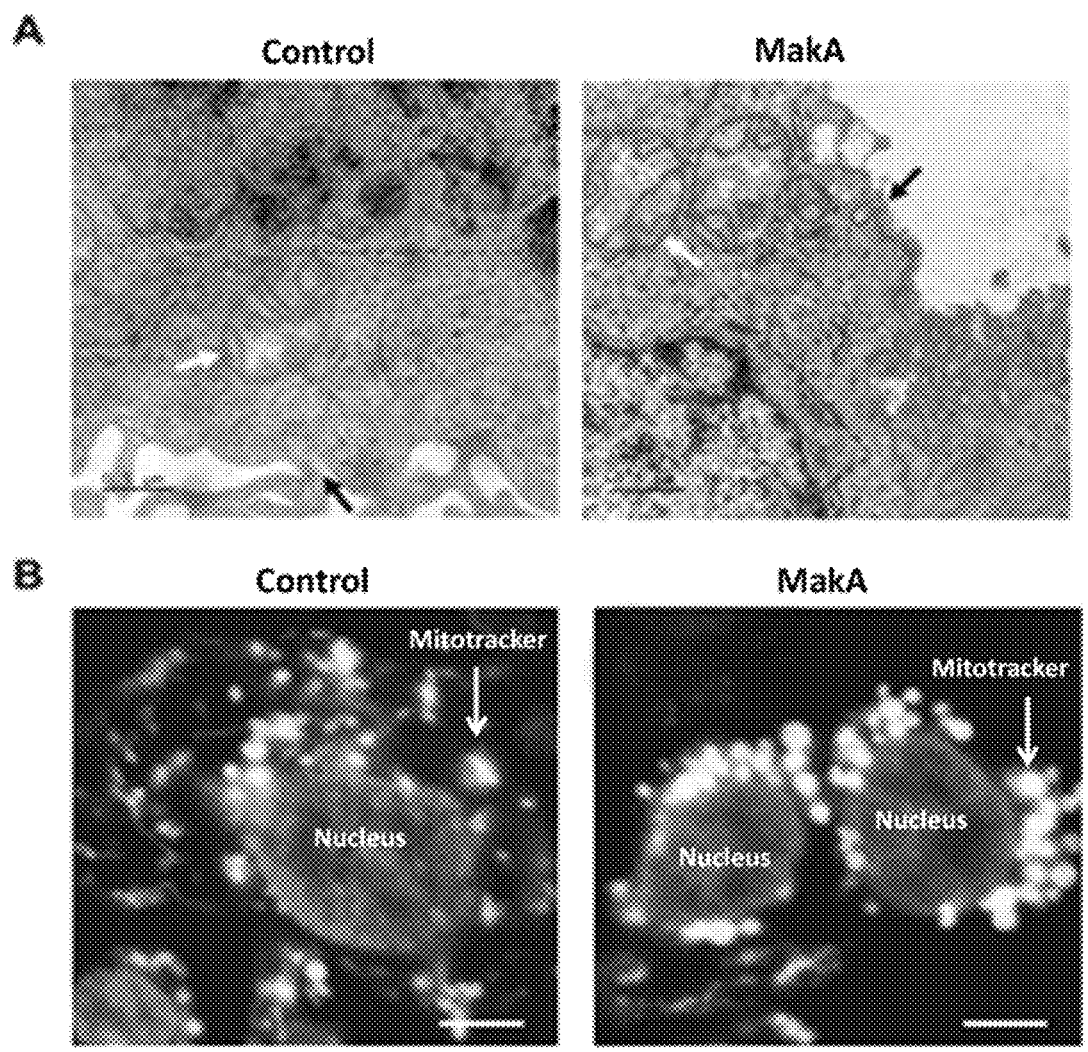

FIG. 4: MakA causes perturbation of plasma membrane, mitochondrial and nuclear membrane damage.

A) MakA causes plasma membrane perturbation (black arrowhead) and mitochondrial damage (white arrowhead). Dashed line in MakA treated cells indicates damage of nuclear membrane. Scale bar=0.5 μm. B) Rounding of mitochondria is evident by the change in Mitotracker staining in response to MakA. Scale bar=10 μm.

Figure 5:
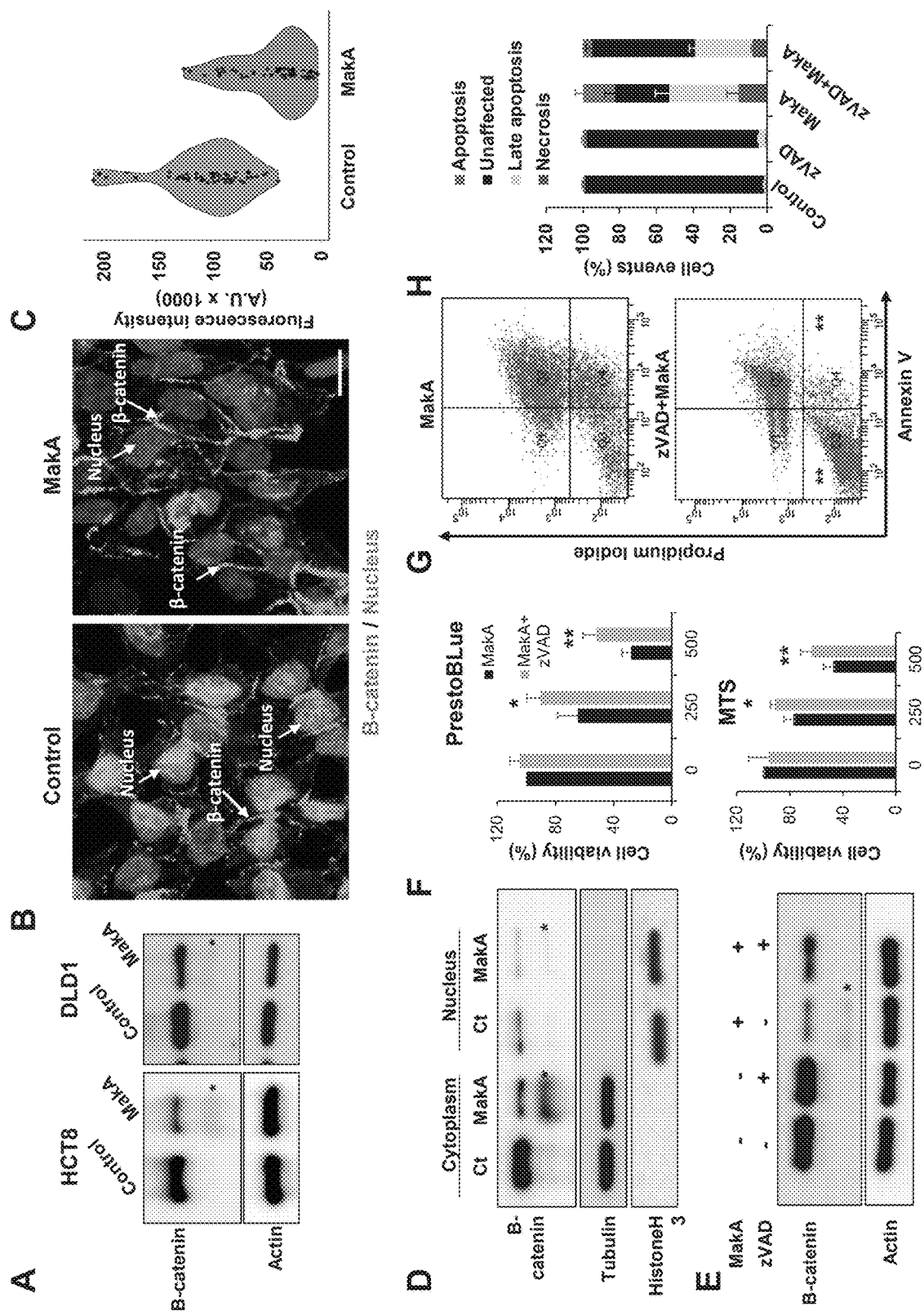

FIG. 5: Caspases play an important role in MakA induced β-catenin fragmentation and cell death.

A) MakA causes fragmentation and suppression of β-catenin in APC mutation harbouring HCT8 and DLD1 cells. B) MakA causes suppression of β-catenin in tumor cell nuclei. Scale bar=20 μm. C) Quantification of β-catenin staining in tumor cell nuclei. D) Western blot confirms cytoplasmic and nuclear suppression of β-catenin in response to MakA. E) Pan caspase inhibitor, zVAD blocks MakA induced fragmentation of β-catenin. F) MakA induced cell death is partially dependent on activation of caspases as shown by cell viability assays. G-H) Flow cytometry-based apoptosis assay shows inhibition of apoptotic population in response to MakA in the presence of zVAD, a pan caspase inhibitor.

Figure 6:
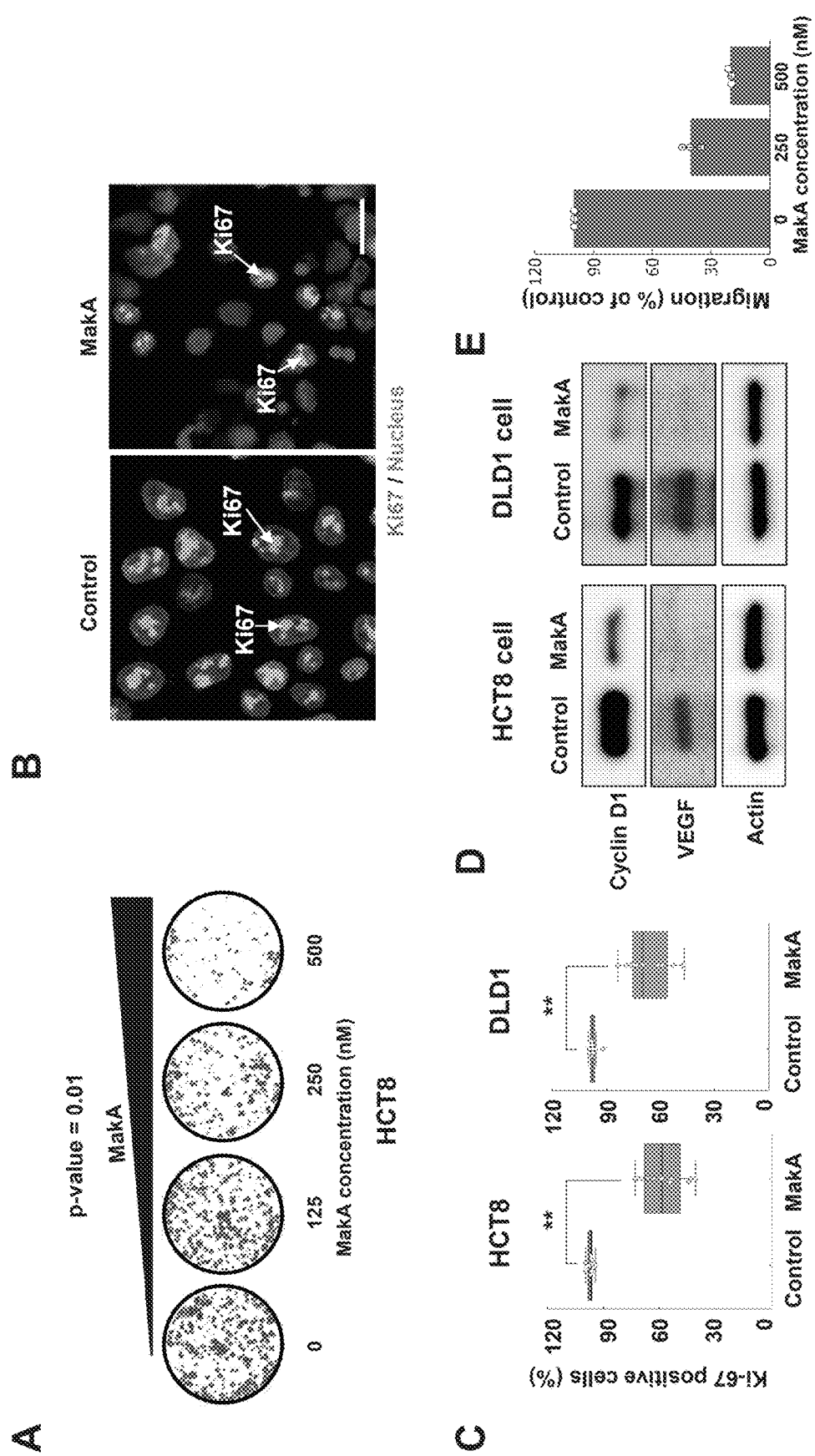

FIG. 6: Suppression of β-catenin mediated proliferation in response to MakA.

A) MakA inhibits tumor cell proliferation in a concentration-dependent manner as measured by colony forming assay. B-C) Suppression of Ki-67 in response to MakA. Scale bar=20 μm. D) Inhibition of β-catenin dependent proteins, cyclin D1 and VEGF in response to MakA in HCT8 and DLD1 colon carcinoma cells. E) MakA causes inhibition of tumor cell migration in a concentration-dependent manner.

Figure 7:
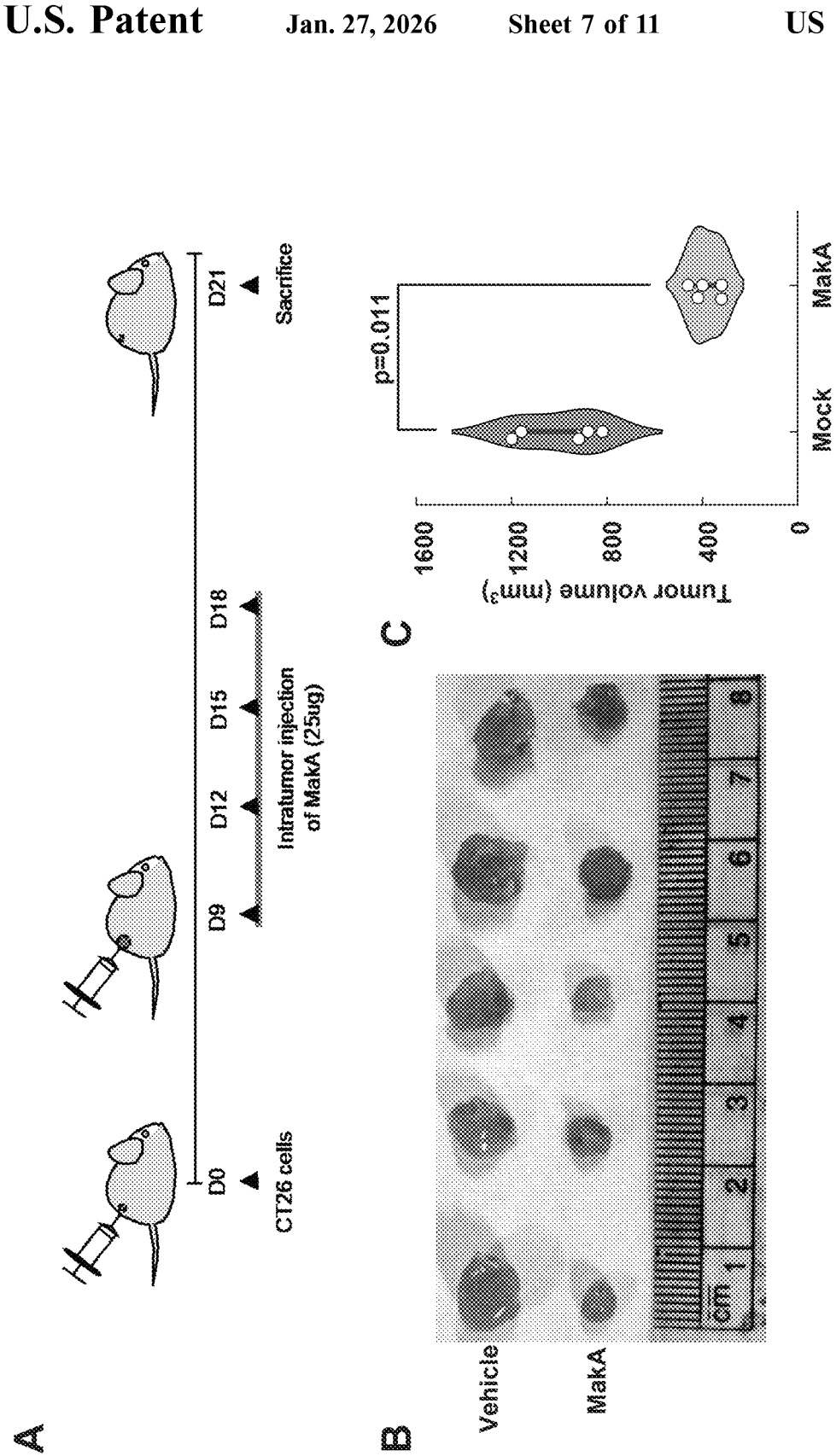

FIG. 7: MakA is therapeutically active against colon cancer in CT26 xenograft mice model.

A) Colon cancer was established using the rapidly proliferating CT26 cell line. From day 9, mice were treated by repeated intratumor injection of MakA (25 μg) or Vehicle (Tris 20 mM) at indicated intervals and sacrificed on day 21. B-C) MakA caused significant reduction in tumor volume to compare to mice treated with vehicle as a control.

Figure 8:
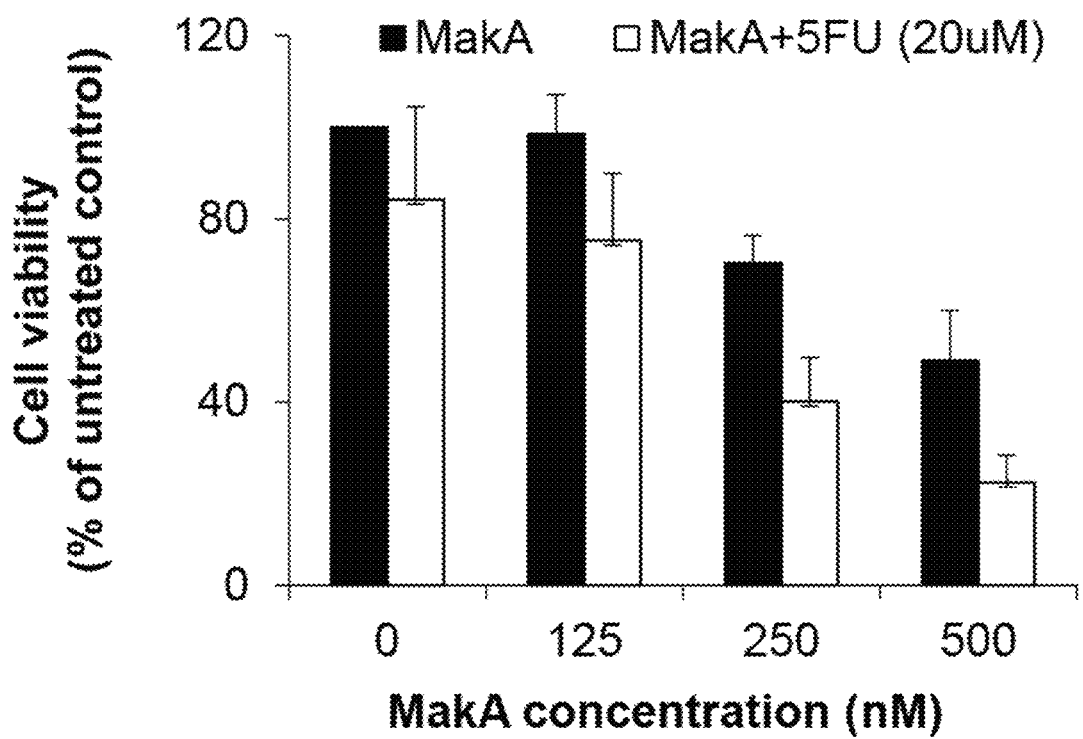
Figure 8:
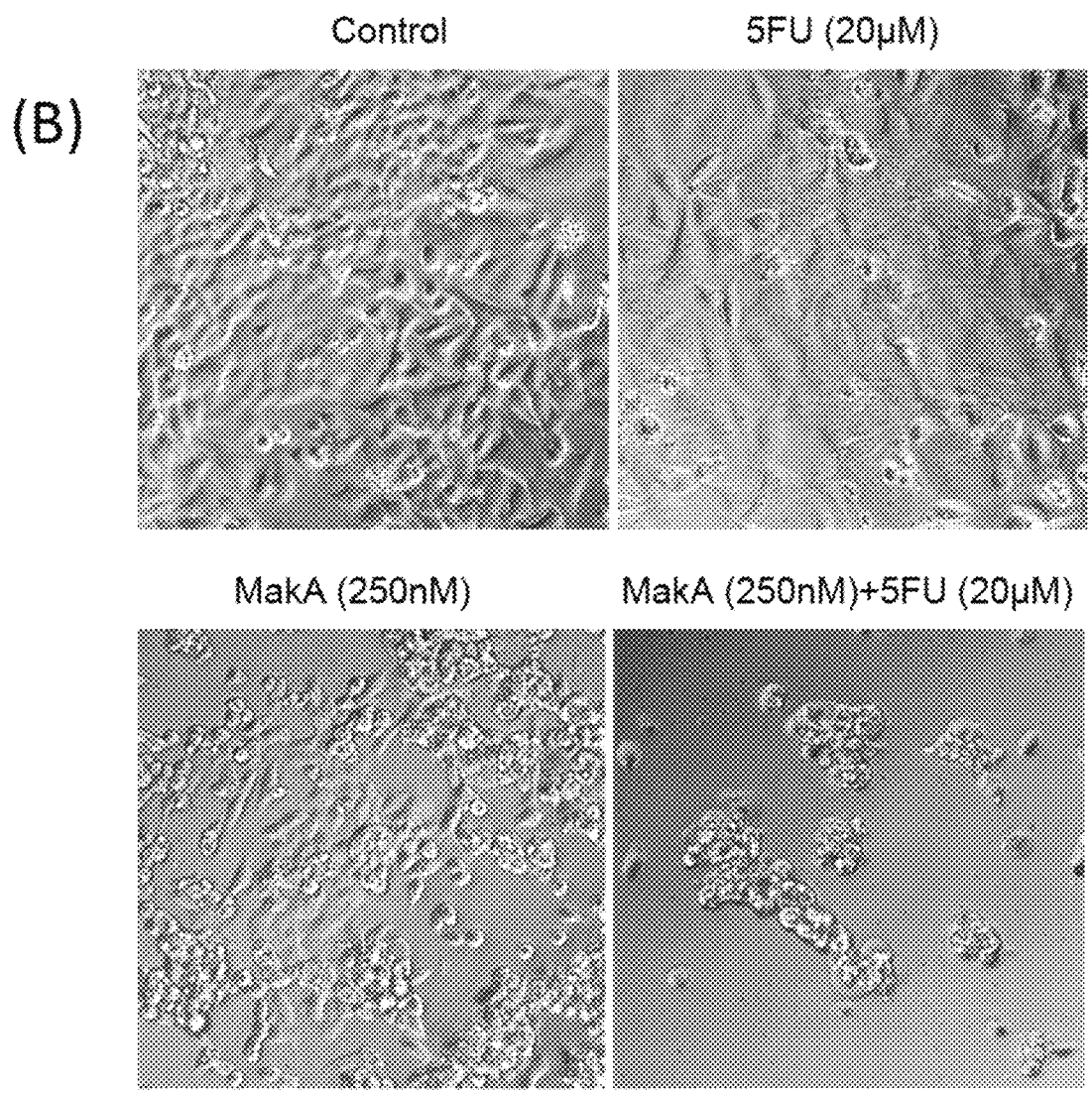

FIG. 8: MakA in combination with 5FU synergistically kills colon carcinoma cells.

A) MakA induced loss of tumor cell viability was synergistically increased by 5FU.

Figure 9:
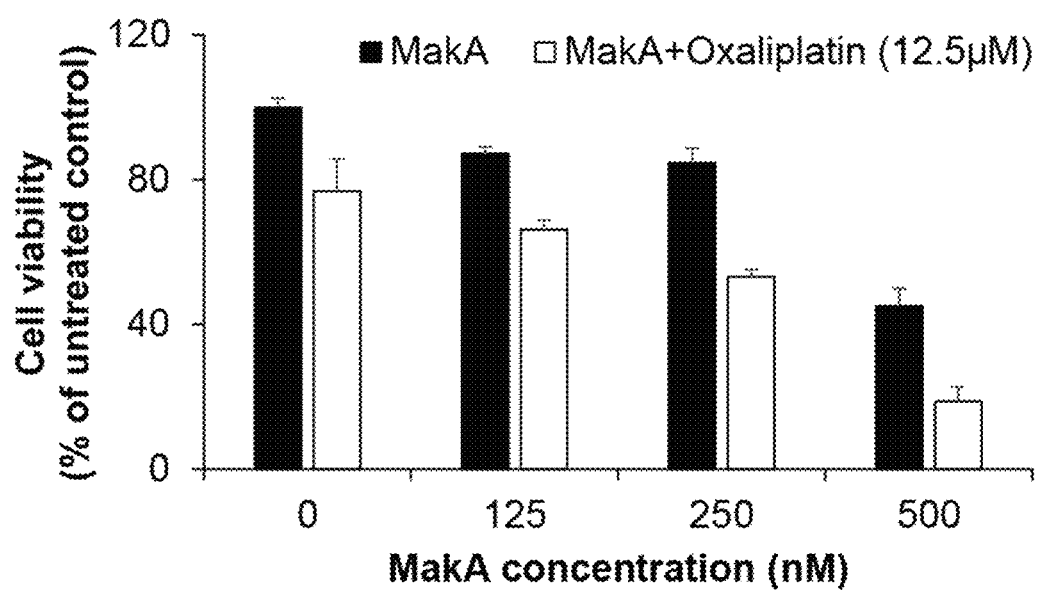

B) Change in tumor cell morphology in response to MakA and 5FU or MakA at different concentration in combination with 5FU (20 μM). Scale bar=30 μm FIG. 9: MakA in combination with oxaliplatin synergistically kills colon carcinoma cells.

Figure 10:
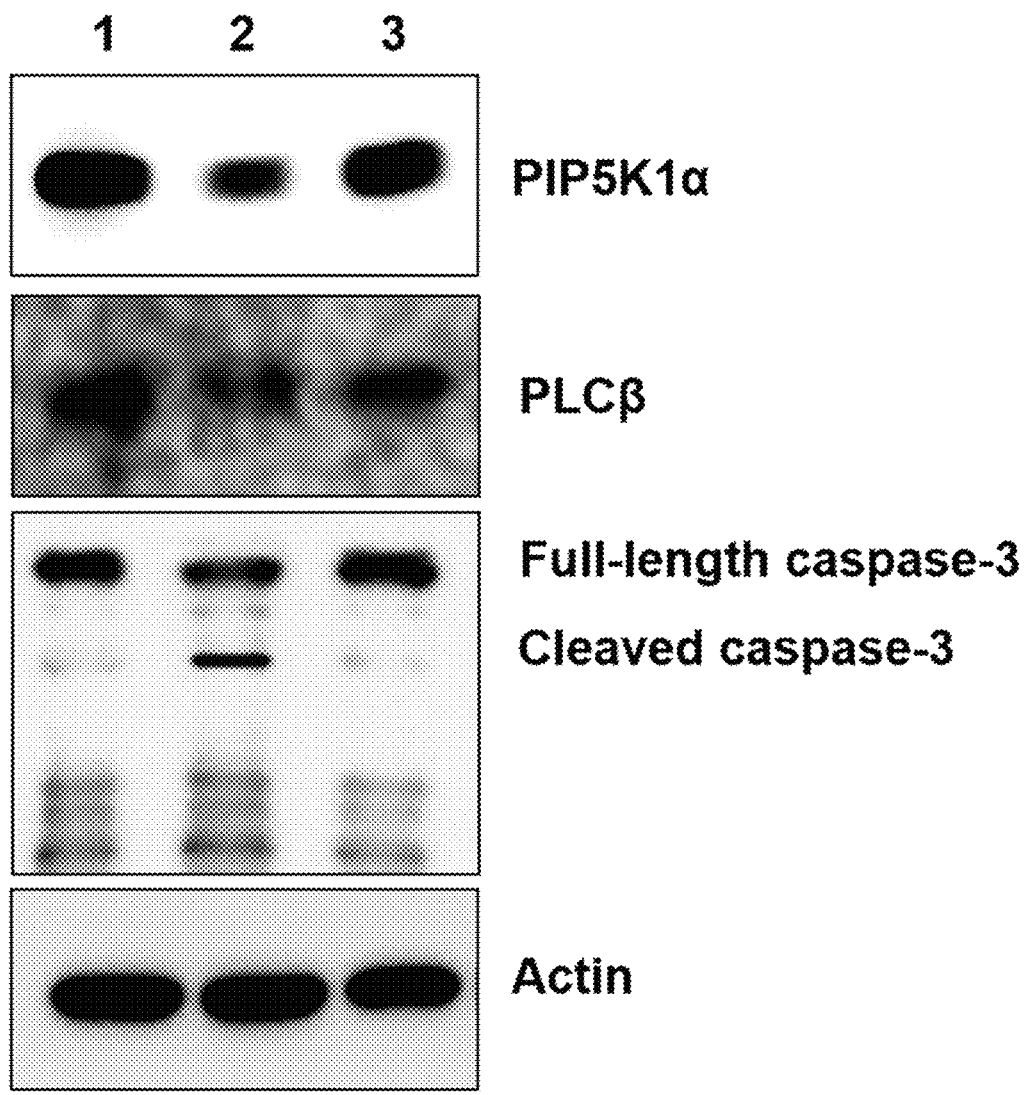

FIG. 10: MakA affects phospholipid signaling in cancer cells.

Immunoblotting on SDS-PAGE. Lane 1: Untreated HCT8 cells; Lane 2: HCT8 cells treated with MakA protein (500 nM); Lane 3: HCT8 cells treated with Tris (20 mM pH 8.0)

DESCRIPTION OF THE INVENTION

It has surprisingly been found that the *Vibrio cholerae* MakA protein is an interesting therapeutic candidate for the treatment of cancer, especially colorectal cancer, due to its specificity and selectivity for tumor cells in vitro.

As shown in the Examples below, tumor cell membranes are remodeled in response to MakA, leading to tumor cell death in a dose-dependent manner. However, non-transformed human colon cells are not affected by MakA. Further, flow cytometry, fluorescent microscopy, western blotting, as well as cell death analysis show that MakA induces apoptosis in tumor cells of diverse origin.

In addition, caspase-dependent suppression of β-catenin signaling is observed in two cell lines of colon carcinoma, HCT8 and DLD1. Importantly, MakA causes a reduction in tumor cell proliferation. These findings provide a molecular basis for the tumoricidal effect of MakA from *V. cholerae*, through inhibition of β-catenin mediated signaling in colon cancer cells. MakA was also shown to significantly reduce tumor volume in CT26 xenograft mice model. Finally, MakA in combination with 5FU was more potent against colon cancer tumor cells in vitro.

Consequently, in a first aspect the invention provides a *Vibrio cholerae* MakA (motility associated killing factor A) protein for use in therapy. In a preferred aspect, the invention provides a *Vibrio cholerae* MakA protein for use in the treatment or alleviation of cancer in a mammalian subject. More preferably, the cancer is colorectal cancer. The said therapy can be either monotherapy, using MakA protein alone, or include the MakA protein in various forms of combination therapy. The said combination therapy can preferably comprise the use of MakA in combination with 5-fluorouracil (5FU) and/or oxaliplatin.

Preferably, the *Vibrio cholerae* MakA protein for use according to the invention is selected from the group consisting of:

(a) a protein comprising the amino acid sequence shown as SEQ ID NO: 1 or SEQ ID NO: 5;

(b) a protein consisting essentially of the amino acid sequence shown as SEQ ID NO: 1 or SEQ ID NO: 5;

(c) a protein which is a functional variant or functional fragment of the amino acid sequence shown as SEQ ID NO: 1 or SEQ ID NO: 5; and (d) a protein consisting of the amino acid sequence shown as SEQ ID NO: 1 or SEQ ID NO: 5.

In another aspect, the invention provides a pharmaceutical composition comprising a *Vibrio cholerae* MakA protein as an active ingredient, together with one or more pharmaceutically acceptable excipients. The said pharmaceutical composition is, in particular, useful in the treatment or alleviation of cancer in a mammalian subject. Preferably, the cancer is colorectal cancer. The said MakA protein is preferably selected from the group consisting of embodiments (a), (b), (c) or (d), as defined above.

The invention further provides a pharmaceutical composition comprising a *Vibrio cholerae* MakA protein as an active ingredient, in combination with 5FU and/or oxaliplatin as a further active ingredient or ingredients.

In yet a further aspect, the invention provides a method of treating or alleviating cancer, preferably colorectal cancer. The said method comprises administering to a subject in need of such treatment a therapeutically effective amount of a pharmaceutical composition comprising a *Vibrio cholerae* MakA protein. The said MakA protein is preferably selected from the group consisting of embodiments (a), (b), (c) or (d), as defined above.

The invention further provides a method as described above wherein the pharmaceutical composition comprises a *Vibrio cholerae* MakA protein in combination with 5FU and/or oxaliplatin as further active ingredient or ingredients.

For therapeutic use, the *Vibrio cholerae* MakA protein can be administered by various routes. Parenteral route is the most commonly employed method of administration for therapeutic proteins and peptides. However, requirement of frequent injections due to short in vivo half-life results in poor patient compliance. Non-invasive drug delivery routes such as nasal, transdermal, pulmonary, and oral offer several advantages over parenteral administration. Intrinsic physicochemical properties and low permeability across biological membrane limit protein delivery via non-invasive routes. One of the strategies to improve protein and peptide absorption is by delivering through nanostructured delivery carriers, such as polymeric nanoparticles (see e.g. Patel, A. et al. (2014) *Protein Pept Lett.* 21(11): 1102-1120).

Colon-specific drug delivery systems are desirable for the treatment of a range of local diseases such as colorectal cancer. Drugs such as proteins and peptides that are known to degrade in the extreme gastric pH, if delivered to the colon intact, can be systemically absorbed by colonic mucosa. In order to achieve effective therapeutic outcomes, it is imperative that the designed delivery system specifically targets the drugs into the colon. Several formulation approaches have been explored in the development colon-targeted drug delivery systems. These approaches involve the use of formulation components that interact with one or more aspects of gastrointestinal (GI) physiology, such as the difference in the pH along the GI tract, the presence of colonic microflora, and enzymes, to achieve colon targeting (for a review, see e.g. Amidon, S. et al. (2015) *AAPS Pharm. Sci. Tech.* 16(4): 731-740).

Definitions

The term "cancer" refers to all types of cancer or neoplasm or malignant tumors found in a subject, including leukemias, lymphomas, myelomas, carcinomas, melanomas, teratomas, and sarcomas. Examples of cancers include cancer of the liver, pancreas, esophagus, brain, bladder, breast, central nervous system (e.g., spine), cervix, colon, rectum, head and neck, kidney, lung, ovary, prostate, sarcoma, stomach, uterus, leukemias, lymphomas, myelomas, and melanomas. In one preferred embodiment, the cancer includes colorectal cancer (CRC), also known as bowel cancer and colon cancer.

The terms "treatment" or "treating" refers to any treatment of a disease of a subject, including, but not limited to, prophylactic treatment and therapeutic treatment. As such, the terms treatment or treating include, but are not limited to: preventing a disease or the development of a disease; inhibiting the progression of a disease; arresting or preventing the development of a disease; reducing the severity of a disease; ameliorating, alleviating or relieving symptoms associated with a disease; and causing a regression of the disease or one or more of the symptoms associated with the disease.

The term "combination therapy" refers to therapy that uses more than one medication or modality. Typically, the term refers to using multiple therapies to treat a single disease. Pharmaceutical combination therapy may be achieved by prescribing/administering separate drugs, or, where available, dosage forms that contain more than one active ingredient.

The term "subject" includes both human and animal subjects.

According to the invention, a pharmaceutical composition may comprise various pharmaceutically acceptable constituents, such as solvents, buffers, carriers, stabilizers, preservatives, etc. The term "pharmaceutically acceptable" means being useful in preparing a pharmaceutical composition that is generally safe, non-toxic and neither biologically nor otherwise undesirable, and includes being useful for veterinary use as well as human pharmaceutical use.

According to the present description and claims, a reference to a product or method "comprising" certain features should be interpreted as meaning that it includes those features, but that it does not exclude the presence of other features, as long as they do not render the invention unworkable. In reference to the compounds or compositions according to the invention, the term "consisting essentially of" means that specific further components can be present, namely those not materially affecting the essential characteristics of the compound or composition.

The term "protein" refers to a polymer of the 20 protein amino acids, or amino acid analogs, regardless of its size or function. Thus, exemplary proteins include gene products, naturally occurring or native proteins, homologs, orthologs, paralogs, fragments and other equivalents, variants, and analogs of the foregoing.

The term "fragment," when used in reference to a protein, refers to a protein in which amino acid residues are deleted as compared to the reference protein itself, but where the remaining amino acid sequence is usually identical to the corresponding positions in the reference protein. Such deletions can occur at the amino-terminus or carboxy-terminus of the reference protein, or alternatively both. A fragment can also be a "functional fragment," in which case the fragment retains some or all of the activity of the reference protein as described herein.

The terms "variant" are used herein to refer to an amino acid sequence that is different from the reference protein by one or more amino acids, e.g., one or more amino acid substitutions, inversions or insertions (additions). A variant of a reference protein also refers to a variant of a fragment of the reference protein. A variant can also be a "functional variant," in which the variant retains some or all of the activity of the reference protein as described herein.

Preferably, a functional fragment or a functional variant of a *Vibrio cholerae* MakA protein has at least 60% identity, such as at least 70%, 75%, 80%, 85%, 90%, or 95%, with the amino acid sequence shown as SEQ ID NO: 1 or SEQ ID NO: 5.

The term "vector" refers to a small-sized DNA having self-replication ability, which is used in order to introduce and express a gene in a host. As a vector, a plasmid or a bacteriophage is normally used.

The term "transformation" means that a vector having a gene different from that of an original cell penetrates cells and binds to a DNA present in the original cell, thereby changing the genetic character of the cell. A cell or individual whose genetic character was changed by the transformation is referred to as a "transformant".

As used herein, the terms "effective amount" and "therapeutically effective amount" refer to an amount of the therapeutic (pharmaceutical) composition (e.g., a composition comprising a *Vibrio cholerae* MakA protein and a pharmaceutically acceptable vehicle, carrier, or excipient) sufficient to produce a measurable biological response. The effective amount in any particular case will depend upon a variety of factors, including the activity of the therapeutic composition, formulation, the route of administration, combination with other drugs or treatments, severity of the condition being treated, and the physical condition and prior medical history of the subject being treated. Determination and adjustment of a therapeutically effective dose, as well as evaluation of when and how to make such adjustments, are known to those of ordinary skill in the art.

In the context of the *Vibrio cholerae* MakA protein, the terms "biological activity", "biological response" and "functional" refer to e.g. the activity of reducing proliferation and/or inducing cell death in cancer cells, such as human colon carcinoma cells.

The term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

EXPERIMENTAL METHODS

Cell Lines and Cell Culture:

Human colon carcinoma cells (HCT8, ATCC CCL-244) were cultured in RPMI-1640 supplemented with non-essential amino acids (1:100), sodium pyruvate (1 mM), penicillin (20 Units), streptomycin (20 μg/mL) and 10% fetal bovine serum (FBS) at +37° C., 5% $CO_2$. Gingival fibroblasts were maintained in DMEM supplemented with non-essential amino acids (1:100), sodium pyruvate (1 mM) and 10% fetal bovine serum (FBS) at +37° C., 5% $CO_2$.

Cloning, Overexpression, and Purification of MakA:

The makA gene (encoding the protein shown as SEQ ID NO: 1; UniProt accession code Q9KL64) was PCR-amplified from genomic DNA of *V. cholerae* strain A1552 using forward primer KPC001 (SEQ ID NO: 2) and reverse primer KPC002 (SEQ ID NO: 3). The PCR product, encoding amino acid residues 1-369 of MakA (SEQ ID NO: 1), was digested with NcoI/Acc65I and cloned into the expression vector pET-His1a (a gift from Gunter Stier, University of Heidelberg, European Molecular Biology Laboratory), in-frame with DNA coding for a cleavable histidine affinity tag having the sequence MKEIREIHHHPMSDYDIPTTENLYFQGAM (SEQ ID NO: 4). Since the introduction of an NcoI site in the 5'-primer causes a mutation, the primer was designed so that the initial MakA residue, Met, was mutated to Gly, keeping the sequence from the second residue intact. After cleavage with TEV protease, the final protein (SEQ ID NO: 5) had the sequence GAMG followed by MakA residues 2-369.

The construct was expressed in *E. coli* BL21(DE3) in LB broth supplemented with 50 pg/mL kanamycin. Induction was initiated with 0.5 mM isopropyl 1-thio-p-d-galactopyranoside (IPTG) at $OD_{600}$=0.6, followed by growth for 5 h at +25° C. Cells were harvested by centrifugation and the pellet stored at −80° C. until further use. The cell pellet was resuspended in 50 mM Tris-HCl pH 7.6, 0.3 M NaCl and 10 mM imidazole (lysis buffer) supplemented with 1% triton-X100 and sonicated on ice. The lysate was centrifuged at 39,000×g for 40 min. The supernatant was loaded onto a column packed with Ni-NTA agarose (Qiagen). The column was washed with 50 mM Tris-HCl pH 7.6, 0.3 M NaCl and 30 mM imidazole after which the protein was eluted with buffer containing 0.3 M imidazole. The buffer of the eluate was exchanged by dialysis to lysis buffer and incubated with 1% (w/w) TEV protease overnight.

The cleaved protein was purified on the Ni-NTA agarose column again and the flow through and wash fractions were concentrated by an Amicon Ultra centrifugal filter device (Millipore). The protein was further purified on a HiLoad™ 16/60 Superdex™ 200 prep-grade column (GE Healthcare) equilibrated with 20 mM Tris-HCl pH 7.6, 0.2 M NaCl. Fractions containing the peak of interest were concentrated in 20 mM Tris-HCl pH 7.6. Selenomethionine (SeMet)-labeled MakA was produced by growing the culture in M9 media supplemented with glucose at +37° C. At an $OD_{600}$~0.4, 100 mg/L each of lysine, threonine, phenylalanine and 50 mg/L each of leucine, isoleucine, valine, proline, SeMet were added and protein expression was induced with IPTG (Doublie, S. (1997) *Methods Enzymol.* 276: 523-530). The SeMet-labeled protein was purified as described above.

Live Cell Microscopy:

Cells were grown in 96 well plate ($1\times10^4$/well, Tecan Group Ltd) overnight and treated with MakA at different concentration for 48 hours at +37° C., 5% $CO_2$. Fluorescence and bright field images were captured with fluorescence microscope (Nikon, Eclipse Ti). Images were processed using the NIS-Elements (Nikon) and ImageJ software. For live cell confocal microscopy, cells were grown on a coverslip and treated with Alexa-568 labelled MakA for 6 or 24 hours at +37° C., 5% $CO_2$.

Cell Death Assays:

For cell death experiments, cells were grown on 96-well plate ($1\times10^4$/well, Tecan Group Ltd) overnight and treated with MakA at different concentration for 48 hours at +37° C., 5% $CO_2$. Cell death was quantified by two different biochemical methods: (1) reduction in PrestoBlue staining; and (2) reduction in MTS absorbance. Cell death is expressed as percentage (%) of untreated control cells for PrestoBlue assay or reduction in absorbance for MTS assay.

Cellular Uptake of MakA:

For uptake experiments, MakA was labelled with Alexa-568 fluorophore according to the manufacturer's instructions (Thermo Scientific, Cat #A10238). Colon carcinoma cells were treated with the Alexa-568 labelled MakA (500 nM) for 6 hours or 24 hours, washed with RPMI media and visualized via real-time confocal microscopy imaging (Nikon EZ-C1). The co-localization of MakA with tumor cell nuclei or mitochondria was detected by incubating the cells with a nuclear marker, Hoechst 33342 (Thermo Fisher Scientific, Cat #62249) or a mitochondrial marker, Mitotracker (Thermo Fisher Scientific, Cat #M7514), according to the manufacturer's instruction. Cells were visualized live under Nikon EZ-C1 confocal microscope (Nikon, Japan), using 40×/1.4 plan Apo ns lens. The $D_{ex}$=405 nm was selected for Hoechst 33342 and $D_{ex}$=561 nm for Alexa-568 labelled MakA. Images were captured and processed using the NIS-Elements (Nikon) and ImageJ software.

Confocal Microscopy:

Colon carcinoma cells were grown on 8-well chamber slide (3×10$^4$/well, Millipore) overnight, followed by treatment with MakA for 6 or 24 hours and treated with either Alexa-568 labelled or unlabeled MakA (500 nM), fixed with 2% paraformaldehyde (20 min), permeabilized with Triton X (0.25%). Cells were incubated with anti-Ki67 (1:300), anti-β-catenin (1:300), anti-pAKT (1:100) primary antibodies overnight at +4° C., followed by incubation with corresponding Alexa-488 or Alex-568 conjugated secondary antibodies (1:200) for 1 hour. Finally, cells were counterstained with nuclear marker DAPI for 5 min. Slides were mounted with Fluoromount™ aqueous mounting medium (Sigma) and examined using EZC1 Eclipse laser scanning confocal microscope (Nikon), using 63×/1.4 plan Apo ns lens. Images were captured and processed using the NIS-Elements (Nikon) and ImageJ software.

Cell Death and Cell Cycle Analysis by Flow Cytometry:

For cell death analysis, cells were treated with MakA or vehicle control for 48 h and were subjected to flow cytometry analysis for apoptotic cell death measurement using either Annexin V/Propidium iodide or Annexin V/7AAD (BD Pharmingen) staining according to manufactures instruction. Percentage of apoptotic cells was determined by BD LSRII and BD Accuri C6 flow cytometer (BD Bioscience), respectively.

For cell cycle analysis, cells were treated with MakA or vehicle control for 48 h, fixed with ethanol (70%), stained with propidium iodide and DNA content was analyzed by flow cytometry.

Statistical Analysis:

Results are presented as a Mean±SEM. Statistical analysis was performed using Student's t-test or the Mann-Whitney test at different statistical levels of significance: *$P<0.05$ and **$P<0.01$.

Chemicals and Antibodies:
AlexaFluor568 protein labeling kit (Thermo Scientific, Cat #A10238);
Hoechst 33342 (Thermo Fisher Scientific, Cat #62249);
Mitotracker (Cell Signalling Technology, Cat #9074S);
DiOC$_6$(3) iodide (Cat #ENZ-52303);
DAPI (Sigma, Cat #D9542);
Presto Blue Cell Viability Assay (Invitrogen, Cat #A13262);
MTS CellTiter 96® AQ$_{ueous}$ (Promega, Cat #G3580);
Monoclonal anti-α-Tubulin (Cell Signalling, Cat #2144S);
Anti-Histone H3 antibody (Abcam, Cat #ab18521);
Monoclonal anti-β-actin (Sigma, Cat #A5441);
Anti-mouse IgG, HRP-linked Antibody (Cell Signaling, Cat #70765);
5-Fluorouracil (Sigma, Cat #F6627
Polyclonal rabbit anti-mouse IgG-HRP (Dako, Cat #P0260);
Polyclonal goat anti-rabbit IgG-HRP (Cell Signaling, Cat #7074);
Rabbit polyclonal anti-VEGF (Abcam, Cat #Ab46154);
Mouse monoclonal anti-Ki-67 (BD Biosciences, Cat #550609);
Rabbit monoclonal anti-cyclin D1 (Thermo Fisher, Cat #sc8396);
Mouse anti-β-catenin (BD Biosciences, Cat #610153);
Goat anti-rabbit IgG Alexa488 (Thermo Fisher, Cat #a-11034);
Goat anti-rabbit IgG Alexa568 (Thermo Fisher, Cat #a-11077).

EXAMPLES OF THE INVENTION

Example 1: MakA Induces Cell Death in Cancer Cells of Diverse Origin

Figure 1:
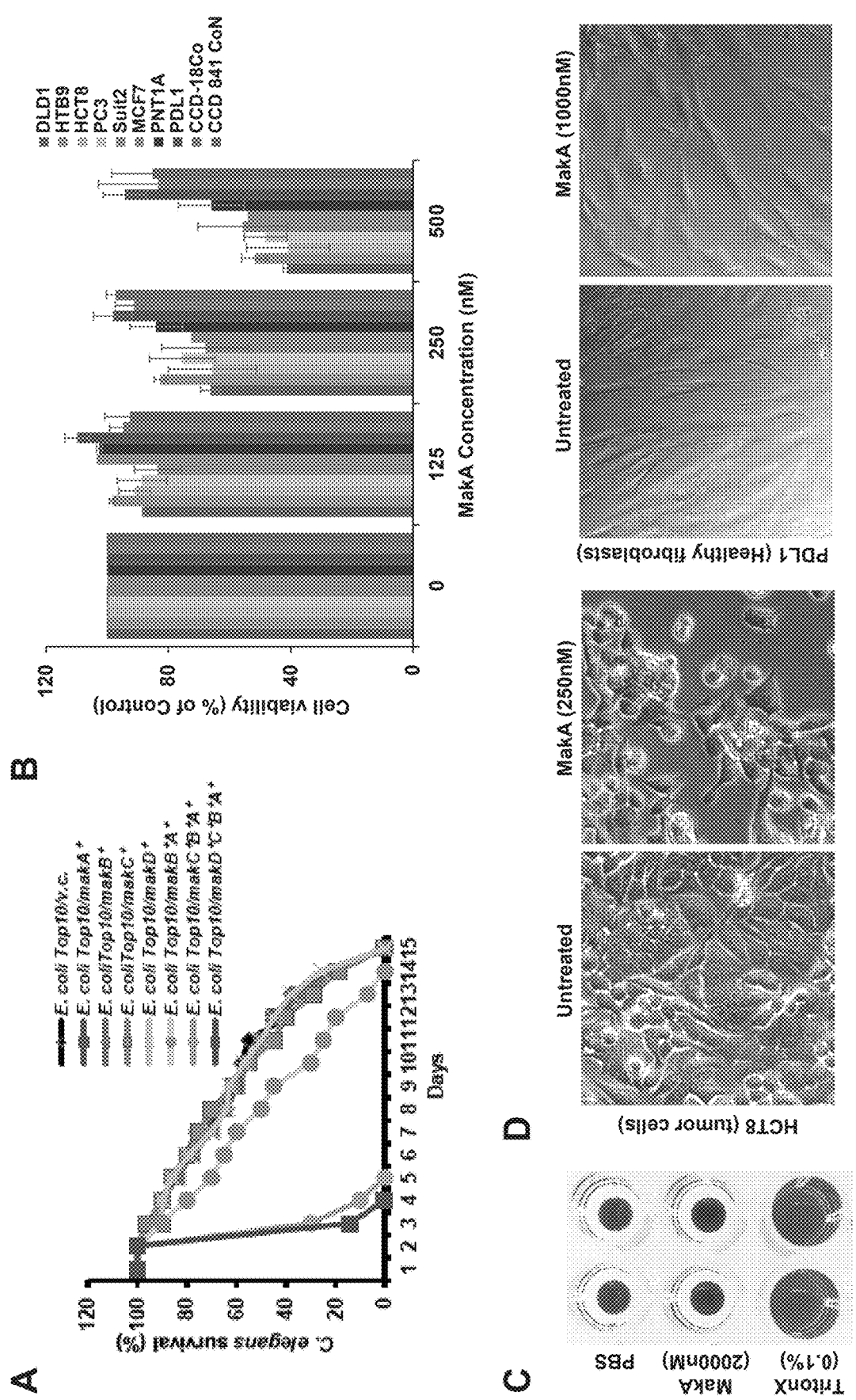
FIG. 1: MakA causes cell death in tumor cells of diverse origin.

Overexpression of individual component of mak operon in *E. coli* failed to induced lethality to *C. elegans*. However, over-expression of at least three components (makCBA) or whole operon (makDCBA) was required for induction of Individual component of the mak operon including MakA overexpressed in *E. coli* were not lethal to *C. elegans*. However, overexpression of at least three components (makCBA) or whole operon (makDCBA) was required for induction of lethality to *C. elegans* (FIG. 1A). The effect of purified MakA protein was investigated on in vitro cultured human tumor cell lines of diverse origin (HCT8 and DLD1=colon cancer cell, PC3=Prostate cancer cells, HTB9=Bladder cancer cell, PC3=Prostate cancer cell, Suit2=Pancreatic cancer cell, MCF7=Breast cancer cells). Results indicate that MakA induces cell death in diverse range of tumor cells in a dose-dependent manner. Importantly, the non-transformed colon cells (CCD-18Co and CCD 841 CoN), prostate (PNT1A) and oral fibroblasts (PDL1) were largely unaffected or intermediately sensitive to MakA at the concentration that effectively killed carcinoma cells, suggesting a tumor specific cell death response by MakA (FIG. 1B-D). MakA failed to induce lysis of human RBCs (FIG. 1C). Furthermore, MakA induced plasma membrane remodeling in human colon carcinoma cells, HCT8 but not in oral fibroblasts, PDL1 (FIG. 1D).

Example 2: MakA Accumulates on Tumor Cell Surface and Intracellular Compartments To investigate the kinetics of MakA cellular uptake, colon carcinoma cells were treated with Alexa-MakA at different time points and cell-bound MakA was quantified by Infinite M200 microplate reader (TECAN). Results indicate that MakA was taken up by tumor cells in a time-dependent manner (FIG. 2A). Cellular distribution of MakA in human colon carcinoma cells (HCT8) or pancreatic cancer cells (Suit2) was investigated by live cell confocal microscopy (FIG. 2B-C). MakA was bound to the cell surface or accumulated in the perinuclear region of both HCT8 and Suit2 cells.

Example 3: MakA Induces Apoptosis in Colon Carcinoma Cells

Apoptotic cell death in response to MakA was investigated using flow cytometry and fluorescent microscopy. By flow cytometric analysis, dose-dependent increase in both early and late apoptotic cell death (FIG. 3A-B) was shown, suggesting that MakA may induce apoptotic cell death in colon carcinoma cells.

The presence of apoptotic cell death in response to MakA was confirmed by nuclear fragmentation and chromatin condensation, visualized by nuclear staining using fluorescence and confocal microscopy (FIG. 3C-D). Furthermore, MakA causes accumulation of active Bax to the mitochondria of an apoptotic cell (FIG. 3E). Interestingly, MakA caused depolarization of the mitochondrial membrane (FIG. 3F).

The regulation of apoptosis involves activation of caspases, increase in Bax/Bcl2 ratio and release of cytochrome c from mitochondria to cytoplasm (Elmore, S. (2007) *Toxicol Pathol.* 2007; 35(4): 495-516). The effect of MakA on expression of these proteins was investigated using western blotting. It was shown that MakA treatment caused induction in expression of pro-apoptotic protein, Bax and decrease in expression of anti-apoptotic protein, Bcl2.

Following an increase in Bax/Bcl2 ratio, mitochondria releases cytochrome c to cytosol that rapidly induces activation of caspase 3. The effect of MakA on expression of cytochrome c and caspase 3 activation was investigated. It was shown that MakA induced increase in cytochrome c expression and activation of caspase 3 (FIG. 3G). Together, these results suggest that MakA has a potent apoptotic effect on HCT8 cells.

Example 4: MakA Causes Perturbation of Plasma Membrane, Mitochondria and Nuclear Membrane To address if MakA accumulation at the cell surface may play an important role in tumor cell membrane perturbation, cells treated with MakA were compared to untreated cells and imaged with transmission electron microscopy (TEM). MakA induced plasma membrane remodelling and mitochondrial damage. In addition, perturbation of the nuclear membrane was observed in response to MakA, unlike control vehicle-treated (Tris 20 mM) cells where nuclear membrane was thick and smooth MakA treatment resulted in irregular thin nuclear membrane indicating its damage (FIG. 4A). The mitochondrial damage was confirmed by confocal microscopy (FIG. 4B).

Example 5: Caspases Play an Important Role in MakA Induced β-Catenin Fragmentation and Cell Death To examine whether MakA affects β-catenin signaling in human colon cancer cells, HCT8 and DLD1 cells carrying mutations that inactivates APC tumor suppressor gene (Mouradov, D. et al. (2014) Cancer Res. 2014 Jun. 15; 74(12):3238-47) were used. It was shown that MakA caused suppression of β-catenin expression in both HCT8 and DLD1 cells (FIG. 5A-B).

To address if MakA decreases the nuclear accumulation of β-catenin, cells were treated with MakA and fractionated into cytoplasmic and nuclear fractions. MakA caused reduction in β-catenin expression both in cytoplasmic and nuclear fractions of the treated cells. Interestingly, MakA induced fragmentation of β-catenin was mainly present in the cytoplasmic fraction. In parallel, β-catenin was shown to accumulate at the plasma membrane in response to MakA compare to untreated control where β-catenin was mainly present in the nuclei of the cell (FIG. 5C-D).

By western blot analysis, β-catenin fragmentation was detected in MakA-treated HCT8 and DLD1 cells (FIG. 5A). As caspase-3 mediated fragmentation of β-catenin has been reported (Steinhusen, U. et al. (2000) *J Biol Chem* 275: 16345-16353), its role in MakA induced β-catenin fragmentation was investigated. It was shown that the pan-caspase inhibitor zVAD-fmk rescued both HCT8 and DLD1 cells from MakA-induced fragmentation and decrease in β-catenin (FIG. 5D). Taken together, these results suggest that caspase play an important role in MakA induced suppression of β-catenin.

To address if caspases plays an important role in MakA induced cell death, colon carcinoma cells were pretreated with zVAD-fmk, a pan caspase inhibitor; (Enzolifesciences, Cat #ALX-260-020-M001) followed by treatment with MakA. Inhibition of caspases by zVAD-fmk partially rescued the cells from MakA-induced cell death as confirmed by biochemical methods i) Presto Blue and ii) MTS (FIG. 5E) and flow cytometry analysis (FIG. 5F-G). Together, these results suggest that caspases play an important role in MakA mediated suppression of β-catenin signaling and MakA induced cell death.

Example 6: Suppression of β-Catenin Mediated Proliferation in Response to MakA

The effect of MakA on tumor cell proliferation was investigated. It was shown that MakA caused significant reduction in tumor cell proliferation as shown by colony forming assay (FIG. 6A). The reduction in tumor cell proliferation was also confirmed by a reduction in number of Ki67 positive cells and reduction in cyclin D1 expression (FIG. 6B-C). To address if MakA causes suppression of tumor cell β-catenin mediated tumor cell migration, expression of VEGF was investigated by western blot that was inhibited in both HCT8 and DLD1 cells (FIG. 6D). Furthermore, MakA caused suppression of tumor cell migration in a dose dependent manner (FIG. 6E). Together, these results suggest that MakA inhibits tumor cell proliferation and migration by causing stable changes in tumor cell proteome.

Example 7: MakA is Therapeutically Active Against Colon Cancer in CT26 Xenograft Mice Model The therapeutic effect of MakA against colon cancer was investigated in a well-established colon cancer model. Colon cancer was established using the rapidly proliferating CT26 cell line. From day 9, mice were treated by repeated intra-tumor injection of MakA (25 μg) or Vehicle (Tris 20 mM) at indicated intervals and sacrificed on day 21 (FIG. 7A). MakA caused significant reduction in tumor volume compare to mice treated with vehicle control (FIG. 7B-C). These results suggest that MakA is therapeutically active against colon cancer.

Example 8: MakA in Combination with 5FU Synergistically Kills Colon Carcinoma Cells 5-fluorouracil (5-FU) is known to improve the treatment outcome in various cancers, especially colorectal cancer (Pardini, B. et al. (2011) *Br J Clin Pharmacol.* 2011 July; 72(1): 162-163). However, the overall response rate of 5-FU is limited to only 10-15% in advanced colorectal cancer.

It was investigated if MakA together with 5FU may have a synergetic effect on tumor cell death. Colon cancer cells (HCT8) were treated 48 hours with increasing concentration of MakA alone or in combination with a fixed amount of 5FU. Cell viability was quantified with the MTS assay (Promega). 5FU synergistically potentiated MakA induced cell death. Data plotted in the histogram are from three independent experiments. The results (FIG. 8A) show that MakA mediated tumor cell death was synergistically increased by 5FU.

Further, the effect on tumor cell morphology was investigated. Unlike 5FU or MakA alone, the combination of MakA and 5FU caused massive changes in tumor cell morphology (FIG. 8B). When compared to untreated control of HCT8 cells, 5FU alone caused increased cell size and MakA alone caused rounding of the cells. When cells were treated with the combination of MakA (250 nM) and 5FU (20 cells were totally destroyed with formation of membrane blebs and loss of cytoplasmic content.

Example 9: MakA in Combination with Oxaliplatin Synergistically Kills Colon Carcinoma Cells Oxaliplatin, sold under the brand name Eloxatin™, is a pharmaceutical compound used to treat colorectal cancer. Often it is used together with fluorouracil and folinic acid (leucovorin) in advanced cancer.

A study with Oxaliplatin and MakA was performed with a procedure similar to the study with 5FU and MakA (cf. Example 8). Colon cancer cells (HCT8) were treated 48 hours with increasing concentration of MakA alone or in combination with a fixed amount of Oxaliplatin. Cell viability was quantified with the MTS assay (Promega).

The results (FIG. 9) show that oxaliplatin synergistically potentiated MakA induced cell death. Data plotted in the histogram are from one biological experiment with technical triplicates.

Example 10: Effect of MakA on Phospholipid Signaling in Cancer Cells

PIP5Ks are a group of kinases that catalyze the production of phosphatidylinositol (4,5)-bisphosphate [PtdIns(4,5)P2]. As well as being a substrate for the enzymes phospholipase C (PLC) and phosphatidylinositol 3-kinase (PI3K), PtdIns (4,5)P2 acts as a second messenger in its own right, influencing a variety of cellular processes (van den Bout, I., and Divecha, N. (2009) *J Cell Sci* 122:3837-3850).

It has been suggested that Phosphatidylinositol 4-phosphate 5-kinases (PIP5K1α) has high potential as a drug target for the development of targeted cancer therapy (East et al. (2020) PIP5K1A: A potential target for cancers with KRAS or TP3 mutations. *Nat Rev Drug Discov.* 19(7):436) and as a central factor that regulates phosphatidylinositol 3-kinase/serine threonine kinase (PI3K/AKT) and androgen receptor (AR) signaling pathways, which are involved in regulation of cell proliferation, survival, and invasion. The effect of MakA on PIP5K/PIP2 signaling may provide significant conceptual advances into an interesting and important biological function.

The effects of MakA on PIP5K1α, PLCβ, actin and caspase-3 were investigated. For immunoblot analysis, HCT8 cells treated with control or MakA toxin were collected and lysed with lysis buffer containing (50 mM Tris, 100 mM NaCl, 1 mM EDTA, 1 mM DTT, 1% Triton X 100, 2% SDS with 1× protease inhibitor cocktail and 1× phosphatase inhibitor). Protein samples were resolved on SDS-PAGE and processed for immunoblotting according to standard procedures. Antisera used were anti-PIP5K1a polyclonal antiserum (1:2000), anti-PLCβ polyclonal antiserum (1:2000), anti-actin polyclonal antiserum (1:5000), and anti-caspase 3 antiserum (1:1000) (all from Cell Signaling Technology, Inc).

The results (FIG. 10, top panel) show that purified MakA protein could efficiently reduce the level of PIP5Kα in HCT8 cells. A reduced level of PLC-β was also observed in MakA-treated HCT8 cells (FIG. 10, second panel). Earlier studies have shown that pertussis toxin can induce apoptosis by modulating the level of PLC-β in target cells (Jajoo et al., 2008 *Neuroscience* 151(2):525-532). As anticipated (cf. Example 5 above), the expression of cleaved caspase-3 was also observed in HCT8 cells treated with MakA (FIG. 10, third panel).

In summary, it was demonstrated that the MakA protein can induce apoptosis in cancer cells via the PIP5Kα/PLC-β pathway. It has not previously been shown that a *Vibrio cholerae* virulence factor modulates apoptosis in host cells via phospholipid signaling.

The invention claimed is:

1. A method of treating or alleviating cancer in a mammalian subject in need thereof, comprising administering to the subject a therapeutically effective amount of a *Vibrio cholerae* motility associated killing factor A (MakA) protein comprising the amino acid sequence set forth in SEQ ID NO:1 or SEQ ID NO:5, wherein the cancer is colorectal cancer.

2. The method of claim 1, wherein the *Vibrio cholerae* MakA protein consists of the amino acid sequence set forth in SEQ ID NO:1 or SEQ ID NO:5.

3. The method of claim 1, wherein the subject is a human.

4. The method of claim 1, further comprising administering 5-fluorouracil (5FU) to the subject.

5. The method of claim 1, further comprising administering oxaliplatin to the subject.

6. The method of claim 1, wherein the MakA protein comprises the amino acid sequence set forth in SEQ ID NO:1.

7. The method of claim 1, wherein the MakA protein comprises the amino acid sequence set forth in SEQ ID NO:5.

8. The method of claim 6, further comprising administering 5-fluorouracil (5FU) and/or oxaliplatin to the subject.

9. The method of claim 7, further comprising administering 5-fluorouracil (5FU) and/or oxaliplatin to the subject.

10. The method of claim 6, wherein the subject is a human.

11. The method of claim 7, wherein the subject is a human.

12. The method of claim 8, wherein the subject is a human.

13. The method of claim 9, wherein the subject is a human.

* * * * *

SEQUENCE LISTING

<160> NUMBER OF SEQ ID NOS: 5

<210> SEQ ID NO 1
<211> LENGTH: 369
<212> TYPE: PRT
<213> ORGANISM: Vibrio cholerae

<400> SEQUENCE: 1

```
Met Ser Gln Gln Val Thr Gln Leu Asn Pro Thr Gln Thr Thr Gln
1               5                   10                  15

Ser Ala Phe Leu Ala Thr Thr Val Ile Thr Ala Gln Cys His Ala Ile
            20                  25                  30

Leu Asn Thr Gln Phe Thr Pro Pro Thr Val Lys Pro Asp Trp Phe Asp
        35                  40                  45

Asp Leu Ser Lys Lys Leu Asp Ser Ala Lys Leu Val Ala Lys Gln Trp
    50                  55                  60

Ile Asp Asp Leu Gly Pro Gln Val Ser Ala Ser Ile Pro Ser Ser Val
65                  70                  75                  80

Ile Asn Phe Asp Ala Thr Phe Gln Ala Ser Ile Asp Ala Ile His Glu
                85                  90                  95

Leu Tyr Lys Ala Asp Pro Thr Ala Ser Gly Lys Asp Asn Thr Thr Val
            100                 105                 110

Gln Gln Ala Ser Gln Ile Met Thr Ala Leu Ser Ser Gln Val Ser Gly
        115                 120                 125
```

Ile Glu Ala Thr Val Lys Gly Met Asn Lys Glu Leu Ser Asp Trp Gly
130                 135                 140

Val Lys Met Gln Ala Ala His Asp Asp Leu Val Asn Gly Ala Thr Asn
145                 150                 155                 160

Ile Gln Lys Thr Ile Ile Asp Leu Gln Thr Asp Ile Glu Ser Met Asn
                165                 170                 175

Asn Ala Ile Asp Asn Asn Arg Ala Ala Ile Glu Lys Leu Asn Lys Asp
                180                 185                 190

Leu Val Tyr Ala Gln Val Ala Val Gly Val Gly Ile Phe Met Leu Val
            195                 200                 205

Ala Gly Val Ala Leu Thr Val Ala Thr Ala Gly Thr Ala Ala Ala Val
210                 215                 220

Ser Gly Gly Ile Ala Ala Val Gly Ala Ala Ser Ile Ile Ala Gly Gly
225                 230                 235                 240

Val Thr Trp Gly Val Leu Gln Asn Gln Ile Asp Asp Asp Tyr Asp Ser
                245                 250                 255

Ile Ala Gln Glu Gln Lys Gln Lys Ala Glu Asp Gln Gln Gln Ile Ile
                260                 265                 270

Ala Leu Gln Gly Leu Ser Asn Ala Ser Ser Ala Val Val Ser Ala Ile
            275                 280                 285

Glu Thr Ser Thr Ser Val Leu Ser Asp Phe Glu Thr Thr Trp Thr Val
290                 295                 300

Phe Gly Asn Glu Leu Asp Asp Val Val Thr Lys Leu Asn Asn Gly Ala
305                 310                 315                 320

Ser Met Gln Ser Ile Ile Met Glu Lys Val Met Ser Asp Ala Ala Lys
                325                 330                 335

Asn Glu Trp Asp Asp Ala Val Glu Leu Ala Lys Gln Leu Ala Ser Ala
                340                 345                 350

Lys Ile Ala Ile Glu Thr Lys Glu Leu Ala Pro Ala Val Lys Gln Ala
            355                 360                 365

Ala

<210> SEQ ID NO 2
<211> LENGTH: 38
<212> TYPE: DNA
<213> ORGANISM: Artificial Sequence
<220> FEATURE:
<223> OTHER INFORMATION: PCR primer

<400> SEQUENCE: 2
gctttccatg ggttcacaac aagttactca gttgaacc                              38

<210> SEQ ID NO 3
<211> LENGTH: 35
<212> TYPE: DNA
<213> ORGANISM: Artificial Sequence
<220> FEATURE:
<223> OTHER INFORMATION: PCR primer

<400> SEQUENCE: 3
gctttggtac cttaagctgc ttgttttact gcagg                                 35

<210> SEQ ID NO 4
<211> LENGTH: 27
<212> TYPE: PRT
<213> ORGANISM: Artificial Sequence
<220> FEATURE:
<223> OTHER INFORMATION: Histidine affinity tag -continued

```
<400> SEQUENCE: 4

Met Lys His His His His His Pro Met Ser Asp Tyr Asp Ile Pro
1               5                   10                  15

Thr Thr Glu Asn Leu Tyr Phe Gln Gly Ala Met
            20                  25

<210> SEQ ID NO 5
<211> LENGTH: 372
<212> TYPE: PRT
<213> ORGANISM: Vibrio cholerae

<400> SEQUENCE: 5

Gly Ala Met Gly Ser Gln Gln Val Thr Gln Leu Asn Pro Thr Gln Gln
1               5                   10                  15

Thr Thr Gln Ser Ala Phe Leu Ala Thr Val Ile Thr Ala Gln Cys
            20                  25                  30

His Ala Ile Leu Asn Thr Gln Phe Thr Pro Pro Thr Val Lys Pro Asp
                35                  40                  45

Trp Phe Asp Asp Leu Ser Lys Lys Leu Asp Ser Ala Lys Leu Val Ala
        50                  55                  60

Lys Gln Trp Ile Asp Asp Leu Gly Pro Gln Val Ser Ala Ser Ile Pro
65                  70                  75                  80

Ser Ser Val Ile Asn Phe Asp Ala Thr Phe Gln Ala Ser Ile Asp Ala
                85                  90                  95

Ile His Glu Leu Tyr Lys Ala Asp Pro Thr Ala Ser Gly Lys Asp Asn
                100                 105                 110

Thr Thr Val Gln Gln Ala Ser Gln Ile Met Thr Ala Leu Ser Ser Gln
            115                 120                 125

Val Ser Gly Ile Glu Ala Thr Val Lys Gly Met Asn Lys Glu Leu Ser
        130                 135                 140

Asp Trp Gly Val Lys Met Gln Ala Ala His Asp Asp Leu Val Asn Gly
145                 150                 155                 160

Ala Thr Asn Ile Gln Lys Thr Ile Ile Asp Leu Gln Thr Asp Ile Glu
                165                 170                 175

Ser Met Asn Asn Ala Ile Asp Asn Asn Arg Ala Ala Ile Glu Lys Leu
                180                 185                 190

Asn Lys Asp Leu Val Tyr Ala Gln Val Ala Val Gly Val Gly Ile Phe
            195                 200                 205

Met Leu Val Ala Gly Val Ala Leu Thr Val Ala Thr Ala Gly Thr Ala
        210                 215                 220

Ala Ala Val Ser Gly Gly Ile Ala Ala Val Gly Ala Ala Ser Ile Ile
225                 230                 235                 240

Ala Gly Gly Val Thr Trp Gly Val Leu Gln Asn Gln Ile Asp Asp Asp
                245                 250                 255

Tyr Asp Ser Ile Ala Gln Glu Gln Lys Gln Lys Ala Glu Asp Gln Gln
                260                 265                 270

Gln Ile Ile Ala Leu Gln Gly Leu Ser Asn Ala Ser Ser Ala Val Val
            275                 280                 285

Ser Ala Ile Glu Thr Ser Thr Ser Val Leu Ser Asp Phe Glu Thr Thr
        290                 295                 300

Trp Thr Val Phe Gly Asn Glu Leu Asp Asp Val Val Thr Lys Leu Asn
305                 310                 315                 320

Asn Gly Ala Ser Met Gln Ser Ile Ile Met Glu Lys Val Met Ser Asp
                325                 330                 335
```

-continued

```
Ala Ala Lys Asn Glu Trp Asp Asp Ala Val Glu Leu Ala Lys Gln Leu
            340                 345                 350

Ala Ser Ala Lys Ile Ala Ile Glu Thr Lys Glu Leu Ala Pro Ala Val
        355                 360                 365

Lys Gln Ala Ala
    370
```